United States Patent
Holl

(10) Patent No.: US 11,322,809 B2
(45) Date of Patent: May 3, 2022

(54) CELL MODULE THAT STORES ELECTRICAL ENERGY, BATTERY AND HOUSING

(71) Applicants: VARTA Microbattery GmbH, Ellwangen Jagst (DE); VW Kraftwerk GmbH, Wolfsburg (DE)

(72) Inventor: Konrad Holl, Aalen (DE)

(73) Assignees: VARTA Microbattery GmbH, Ellwangen Jagst (DE); VW Kraftwerk GmbH, Wolfsburg (DE)

( * ) Notice: Subject to any disclaimer, the term of this patent is extended or adjusted under 35 U.S.C. 154(b) by 49 days.

(21) Appl. No.: 15/767,761

(22) PCT Filed: Sep. 26, 2016

(86) PCT No.: PCT/EP2016/072870
§ 371 (c)(1),
(2) Date: Apr. 12, 2018

(87) PCT Pub. No.: WO2017/063858
PCT Pub. Date: Apr. 20, 2017

(65) Prior Publication Data
US 2018/0309094 A1    Oct. 25, 2018

(30) Foreign Application Priority Data

Oct. 16, 2015   (DE) .................... 10 2015 220 196.1

(51) Int. Cl.
*H01M 50/545* (2021.01)
*H01M 50/502* (2021.01)
(Continued)

(52) U.S. Cl.
CPC ....... *H01M 50/545* (2021.01); *H01M 50/502* (2021.01); *H01M 50/531* (2021.01);
(Continued)

(58) Field of Classification Search
None
See application file for complete search history.

(56) References Cited

U.S. PATENT DOCUMENTS 8,748,030 B2    6/2014    Byun et al.
2008/0152993 A1  6/2008    Seiler et al.
(Continued)

FOREIGN PATENT DOCUMENTS

CN    101847701 A    9/2010
CN    102136562 A    7/2011
(Continued)

OTHER PUBLICATIONS

Notice of Reasons for Rejection dated Jan. 18, 2019, of counterpart Japanese Application No. 2018-524555, in English.
(Continued)

*Primary Examiner* — Jonathan Crepeau
(74) *Attorney, Agent, or Firm* — DLA Piper LLP (US)

(57) ABSTRACT

A cell module stores electrical energy, a battery has such a cell module and a module housing for such a cell module. The module housing includes an internal space in which n cells each having at least one positive and at least one negative electrode are arranged. In this case, n≥2 and the module housing here has at least three external electrical connection poles. The battery includes at least two such cell modules. The module housing includes at least three apertures through which electrical conductors are guided from the inside of the module housing to the outside.

5 Claims, 2 Drawing Sheets

(51) Int. Cl.
  *H01M 50/531* (2021.01)
  *H01M 50/543* (2021.01)
  *H01M 50/20* (2021.01)
  *H01G 9/008* (2006.01)
  *H01G 9/08* (2006.01)
  *H01G 9/26* (2006.01)

(52) U.S. Cl.
  CPC .......... *H01M 50/543* (2021.01); *H01G 9/008* (2013.01); *H01G 9/08* (2013.01); *H01G 9/26* (2013.01); *H01M 50/20* (2021.01)

(56) References Cited

U.S. PATENT DOCUMENTS

| | | | |
|---|---|---|---|
| 2011/0183197 | A1 | 7/2011 | Byun et al. |
| 2012/0082885 | A1 | 4/2012 | Matthias et al. |
| 2012/0171552 | A1 | 7/2012 | Lachenmeier et al. |
| 2012/0189901 | A1 | 7/2012 | Chuang |
| 2013/0089761 | A1 | 4/2013 | Schiemann et al. |
| 2014/0295222 | A1* | 10/2014 | Wang .................. H01M 10/486 429/61 |
| 2016/0172635 | A1 | 6/2016 | Stimm et al. |

FOREIGN PATENT DOCUMENTS

| | | | |
|---|---|---|---|
| CN | 201893411 | U | 7/2011 |
| CN | 102280596 | A | 12/2011 |
| CN | 102610846 | A | 7/2012 |
| CN | 103018677 | A | 4/2013 |
| CN | 104980103 | A | 10/2015 |
| DE | 666 583 | C | 9/1939 |
| DE | 103 17 986 | A1 | 11/2004 |
| DE | 10 2006 061 270 | A1 | 6/2008 |
| DE | 102009006465 | A1 | 7/2010 |
| DE | 10 2010 024 235 | A1 | 12/2011 |
| DE | 10 2010 041 765 | A1 | 4/2012 |
| DE | 10 2011 075 091 | A1 | 11/2012 |
| DE | 10 2013 213 550 | A1 | 1/2015 |
| EP | 863563 | * | 9/1998 |
| EP | 2207221 | A1 | 7/2010 |
| EP | 2 958 164 | A1 | 12/2015 |
| JP | 2002-008605 | A | 1/2002 |
| JP | 2007-095597 | A | 4/2007 |
| JP | 2009-272161 | A | 11/2009 |

OTHER PUBLICATIONS

The First Chinese Office Action dated Apr. 3, 2020, of counterpart Chinese Application No. 201680060494.X, along with an English translation.
The Third Chinese Office Action dated Apr. 25, 2021, of counterpart Chinese Application No. 201680060494.X, along with an English translation.

* cited by examiner

CELL MODULE THAT STORES ELECTRICAL ENERGY, BATTERY AND HOUSING

TECHNICAL FIELD

This disclosure relates to a cell module that stores electrical energy and a battery having such a cell module, in particular for use in hybrid vehicles.

BACKGROUND

With hybrid vehicles, a distinction is made between pure hybrids (HEV for short, for "hybrid electric vehicle") and so-called plug-in hybrids (PHEV for short, for "plug-in hybrid electric vehicle").

A HEV is a motor vehicle driven by an electric motor and an internal combustion engine. A HEV has two energy stores: a tank for a fuel such as gasoline, diesel or hydrogen and a battery for storing electrical energy. The HEV further has an internal combustion engine and an electric motor coupled to the two energy stores. There is no provision for charging the battery from external energy sources.

PHEVs basically have the same construction as HEVs. However, in a PHEV, the battery can also be charged externally at the power grid. The battery in a PHEV is usually dimensioned to be larger than in a HEV.

In both HEVs and PHEVs, the batteries are usually modular systems comprising a plurality of cells connected in series, each having a positive and a negative electrode. The cells generally have a housing with two external connection poles. One of the connection poles is coupled to the at least one positive electrode, the other to the at least one negative electrode. The cells are generally interconnected in series by the connection poles. For example, twelve cells based on lithium ions (switch-off voltage of the individual cell=4.2 V) can thus be interconnected to form a battery having a maximum voltage of 50.4 V.

There is a need for a modularly constructed battery that can be adjusted in a flexible and simple manner to different demands in HEVs and PHEVs, in particular in terms of the respectively required voltage, without varying the type or the number of cell modules comprised by the battery.

SUMMARY

I provide a cell module that stores electrical energy including a metallic module housing, and n identical cells each having at least one positive and at least one negative electrode arranged within the module housing, wherein n≥2, the module housing has at least three external electrical connection poles, and the n cells have a common electrolyte system.

I also provide a battery including two or more cell modules that store electrical energy including a metallic module housing, and n identical cells each having at least one positive and at least one negative electrode arranged within the module housing, wherein n≥2, the module housing has at least three external electrical connection poles, and the n cells have a common electrolyte system, interconnected with one another in series or in parallel by external electrical connection poles.

I further provide a module housing for the cell module that stores electrical energy including a metallic module housing, and n identical cells each having at least one positive and at least one negative electrode arranged within the module housing, wherein n≥2, the module housing has at least three external electrical connection poles, and the n cells have a common electrolyte system, having at least three apertures through which electrical conductors are guided from inside the module housing to the outside.

DETAILED DESCRIPTION

Figure 1:
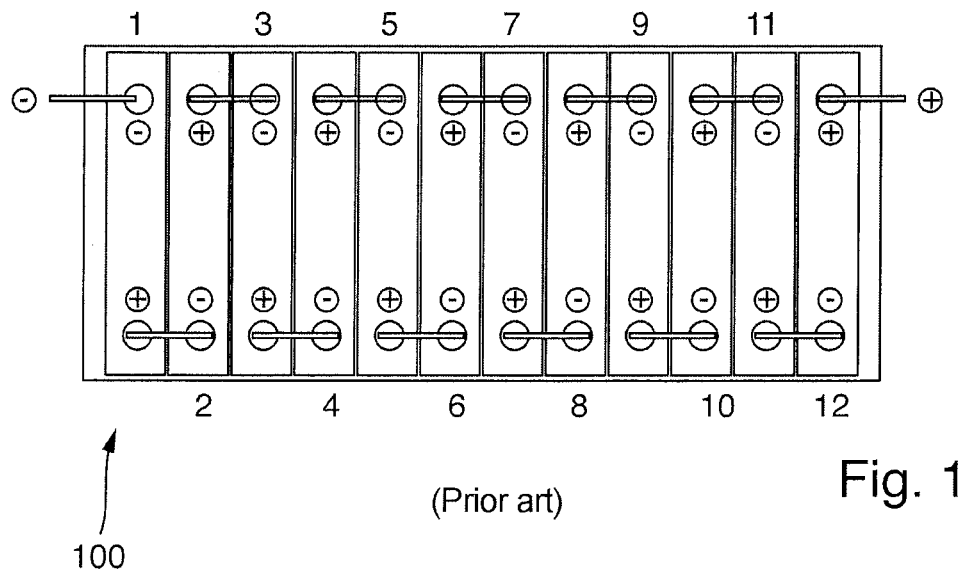
FIG. 1 schematically shows a plan view of a prior art battery.

My cell module comprises:
a module housing, and
within the module housing, n cells each having at least one positive and at least one negative electrode.

In this case, n≥2 and the module housing here has at least three external electrical connection poles.

The cell module can comprise electrochemical cells of any kind as then cells. The cell module particularly preferably comprises battery or capacitor cells or a combination of battery and capacitor cells. Both individual cells and cell composites that comprise a plurality of individual cells can be used as the cells. The n cells are particularly preferably n individual cells.

The simplest individual cell is a cell comprising a positive and a negative electrode, that is to say a cell having the sequence:
positive electrode/separator/negative electrode.

Furthermore, so-called bicells are also considered to be individual cells, that is to say cells having the sequence:
positive electrode/separator/negative electrode/separator/positive electrode
or
negative electrode/separator/positive electrode/separator/negative electrode.

A stack composed of a plurality of individual cells having one of the mentioned sequences can be used, for example, as the cell composite. If a cell or a cell composite contains two or more electrodes of the same polarity, it is generally preferable for the electrodes to be electrically connected to one another by appropriate conductors, usually by welding.

Preferably, each of the n cells has its own cell housing, in particular a housing composed of a composite film, for example, a metal-plastic composite film. n cell housings are then arranged in the module housing.

However, it is also possible for the n cells to not have their own cell housing. In this case, the module housing functions as the cell housing. The n cells can then have a common electrolyte system, for example.

Preferably, the cell module comprises n cells based on lithium ions, that is to say cells in which, during charging and discharging processes, lithium ions move from the positive to the negative electrode and vice versa. The cells can be present within the module housing in the form of windings or in stacked form.

Particularly preferably, the module housing contains n=2 wound individual cells as the cells.

It is preferable for the n cells within the module housing to all be identical. This should be understood to mean that the cells have been produced from the same materials and components and under the same conditions and that they each have the same construction, the same rated capacitance and the same rated voltage.

Particularly preferably, n=2 identical cells are arranged within the module housing, in particular n=2 identical wound individual cells.

The at least three external electrical connection poles can serve for direct contact-connection of an electrical load located outside of the module housing. However, the connection poles preferably interconnect the cell module to the poles of at least one further cell module, preferably at least one further cell module of the same type.

A metallic component part arranged on an outer side of the module housing usually serves as the connection pole. However, the module housing itself can also serve as one of the electrical connection poles or at least as an electrical bridge between one of the connection poles and one of the electrodes arranged within the module housing, provided that the module housing is of an electrically conductive design.

The cell module is preferably distinguished in that the module housing has either two positive external electrical connection poles electrically connected to the positive electrodes of the n cells, and at least one negative external electrical connection pole electrically connected to the negative electrodes of the n cells, or two negative external electrical connection poles electrically connected to the negative electrodes of the n cells, and at least one positive external electrical connection pole electrically connected to the positive electrodes of the n cells.

The cell module is particularly preferably distinguished by at least one of the following features, in particular by a combination of the following features:
the module housing has a first and a second positive external electrical connection pole,
the module housing has a first and a second negative external electrical connection pole,
the two first connection poles belong to a first circuit,
the two second connection poles belong to a second circuit, and/or
the first and the second circuit are isolated from one another.

In such a particularly preferred configuration of the cell module:
a first cell having at least one first positive and at least one first negative electrode and a second cell having at least one second positive and at least one second negative electrode are arranged within the module housing,
the at least one first positive electrode electrically connects to the first positive external electrical connection pole,
the at least one first negative electrode electrically connects to the first negative external electrical connection pole,
the at least one second positive electrode electrically connects to the second positive external electrical connection pole, and
the at least one second negative electrode electrically connects to the second negative external electrical connection pole.

It may be preferable for cells that differ from one another to be arranged within the module housing. This variant may be advantageous, in particular, when the different cells have the same electrolyte system. For example, it is possible to combine a cell based on C//NMC (Li nickel-manganese-cobalt) with a cell based on C//LFP (Li iron phosphate). Both systems generally use a lithium salt dissolved in an organic solvent (usually a mixture of two or more organic carbonates) as the electrolyte.

By the configuration of the cell module having at least three external electrical connection poles, two or more cells can be built in a manner isolated from one another in one and the same module housing. The cell module can accordingly supply different voltages.

A plurality of cell modules can be interconnected in series or in parallel by their external connection poles depending on requirements. As a result, batteries can be constructed with a high degree of flexibility and in a very cost-effective manner. For example, twelve identical cell modules based on lithium ions (switch-off voltage of the individual cell=4.2 V), each of which are equipped with the first and the second cell and each have two positive and two negative connection poles coupled to the electrodes of the first and the second individual cell in the described manner, can thus be interconnected to form a battery having 1×50.4 V or 2×50.4 volts or even 1×100.8 V. The battery having 1×50.4 V can also be formed with just six such cell modules. The cell modules are therefore particularly suitable for the construction of very compact batteries having voltages of ≤60 V. Such batteries are suitable, for example, for HEVs and PHEVs.

Each battery comprising a cell module, preferably two or more of the cell modules, is a subject of this disclosure. The cell modules are preferably interconnected with one another in series or in parallel by their external electrical connection poles.

Particularly preferably, my batteries comprise a first and a second cell module in accordance with the preferred example described above, in which:
the module housing has a first and a second positive external electrical connection pole,
the module housing has a first and a second negative external electrical connection pole,
the two first connection poles belong to a first circuit,
the two second connection poles belong to a second circuit, and
the first and the second circuit are isolated from one another,
wherein the first positive external electrical connection pole of the first cell module electrically connects to the first negative external electrical connection pole of the second cell module and the second positive external electrical connection pole of the first cell module electrically connects to the second negative external electrical connection pole of the second cell module.

The battery may comprise m such cell modules connected in series, wherein m is preferably 12 and adjacent cell modules each preferably interconnect like the first and the second cell module.

The battery preferably comprises at least one cell based on C//NMC (Li nickel-manganese-cobalt) and/or based on C//LFP (Li iron phosphate).

The battery may comprise a receptacle in which the cell modules interconnected with one another are arranged next to one another. In this case, the receptacle may be, for example, a receptacle made of plastic.

The module housing is designed, in particular, for a cell module. The module housing is distinguished in that it has at least three apertures, preferably four apertures, through which electrical conductors are guided from the inside of the module housing to the outside. The electrical conductors may be pole studs, for example.

The module housing may consist of metal, for example, aluminum plate.

The module housing is preferably composed of a receptacle having a rectangular housing base and four side walls arranged at right angles thereto and a housing cover, which is substantially the same shape and size as the housing base.

In other words, the module housing is preferably cuboidal. The housing cover as a rule is hardly profiled and can be referred to as approximately level. The module housing is usually closed by virtue of the edges of the housing cover being welded to the opening rim of the receptacle.

The module housing particularly preferably consists of a metal such as the aluminum plate and is composed of the receptacle having the rectangular housing base and the housing cover.

When the module housing consists of metal, the electrical conductors guided through the apertures have to be isolated from the module housing.

Preferably, the module housing can also consist of a metal film or of a metal-plastic composite film. The latter is preferably constructed in multilayer form and preferably comprises at least one layer of aluminum.

Further features and advantages emerge from the following description of the drawings. The examples described below serve merely for explanation and better understanding and should in no way be understood as restrictive.

FIG. 1 (prior art) shows a plan view of a battery 100 composed of conventional cells, each of which have a housing with two electrical connection poles (a positive and a negative pole). The drawing is a schematic illustration.

Overall, the battery comprises twelve cells 1-12 based on lithium ions (voltage of the individual module: 4.2 V). The positive and negative poles of adjacent cells each electrically connect to one another by their connection poles. The twelve cells can be interconnected by this serial interconnection to form a battery having a maximum voltage of 50.4 V.

Figure 2:
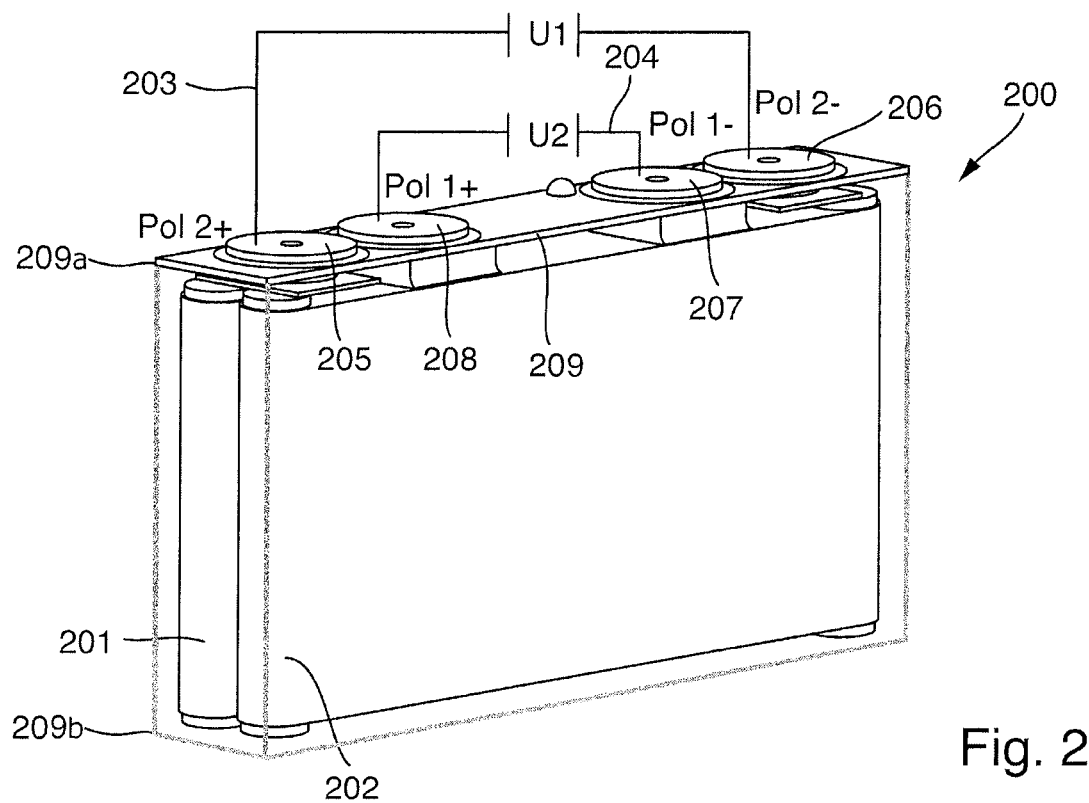
FIG. 2 schematically shows a plan view of an example of one of my cell modules.

FIG. 2 shows a plan view (schematically) of an example of a cell module 200. The cell module 200 comprises two winding cells 201 and 202, each having at least one positive and at least one negative electrode. Moreover, the cell module comprises four external connection poles: the positive connection poles 205 and 208 and the negative connection poles 206 and 207. The cells 201 and 202 are arranged within the module housing 209. The module housing 209 is composed of the receptacle 209b (shown here as transparent for the purpose of better clarity) having a rectangular housing base and four side walls arranged at right angles thereto and a housing cover 209a, which is substantially the same shape and size as the housing base.

The positive connection pole 205 electrically connects to the at least one positive electrode of one of the two winding cells 201 and 202. The positive connection pole 208 electrically connects to the at least one positive electrode of the other of the two winding cells 201 and 202. The negative connection pole 206 electrically connects to the at least one negative electrode of one of the two winding cells 201 and 202. The negative connection pole 207 electrically connects to the at least one negative electrode of the other of the two winding cells 201 and 202. The two connection poles 205 and 206 belong to a first circuit 203. The two connection poles 207 and 208 belong to a second circuit 204. The first and the second circuit 203 and 204 are isolated from one another.

Since the winding cells 201 and 202 are identical cells (lithium-ion cells having a voltage of 4.2 V), the first and the second circuit each supply the same voltage (U1=U2).

Figure 3:
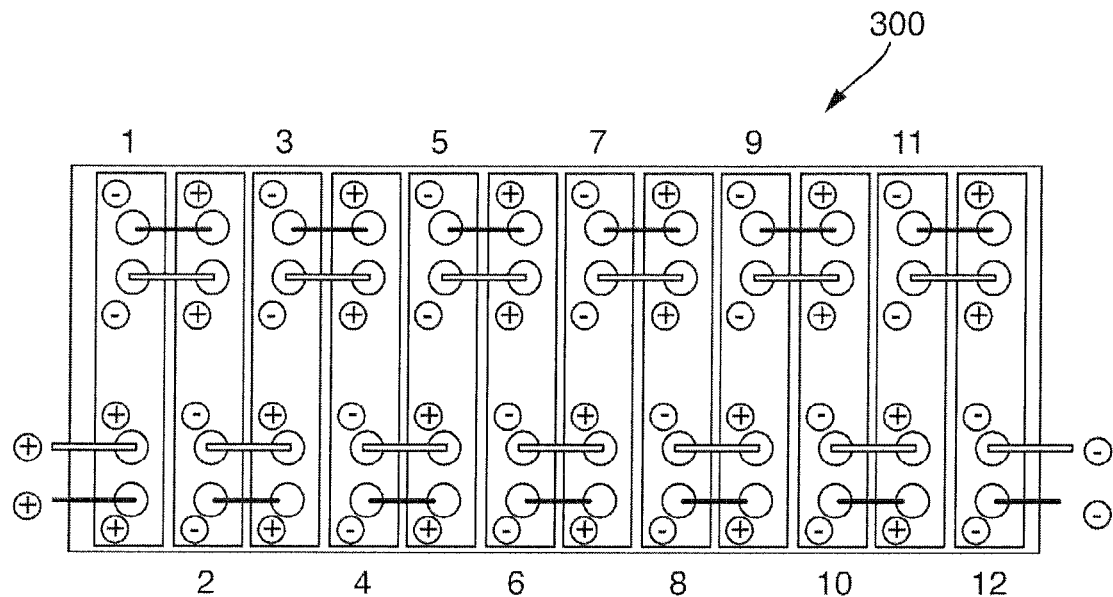
FIG. 3 schematically shows a plan view of another example of one of my cell modules.

FIG. 3 shows a plan view (schematically) of an example of a battery 300 composed of cell modules, as are illustrated in FIG. 2. Each of the cell modules 1-12 accordingly has a module housing having four electrical connection poles (two positive and two negative poles).

The positive and negative poles of adjacent cell modules each electrically connect to one another by their connection poles. The selected interconnection of the twelve cell modules provides a battery that can supply a maximum voltage of 50.4 V twice (independently of one another).

Figure 4:
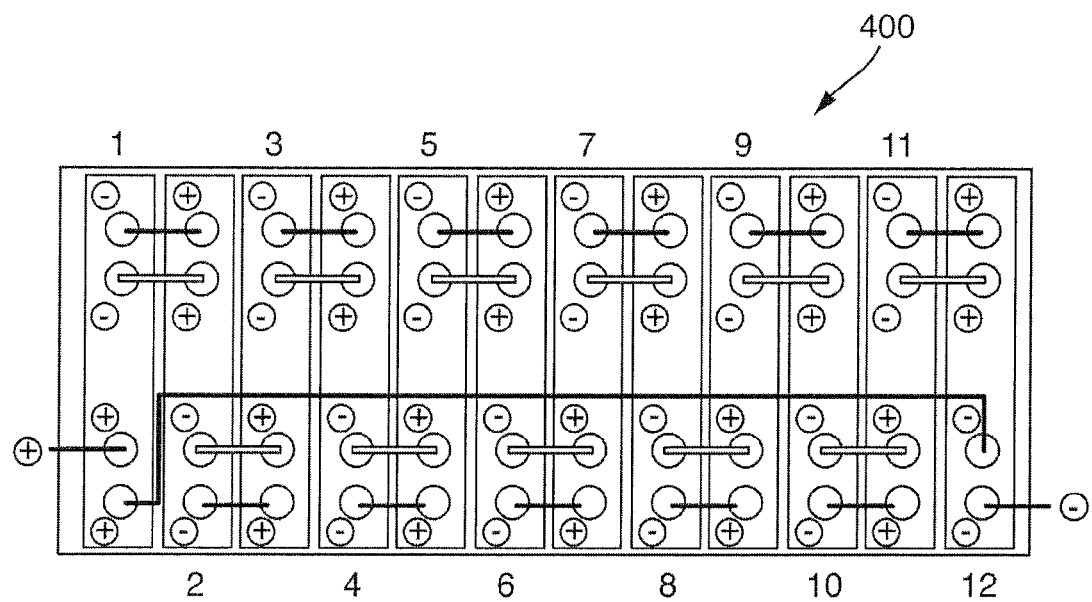
FIG. 4 schematically shows a plan view of yet another example of one of my cell modules.

FIG. 4 shows a plan view (schematically) of an example of a battery 400 composed of cell modules, as are illustrated in FIG. 2. Each of the cell modules 1-12 accordingly has a housing having four electrical connection poles (two positive and two negative poles).

The positive and negative poles of adjacent cell modules each electrically connect to one another by their connection poles. Moreover, a positive connection pole of the cell module 1 electrically connects to a negative connection pole of the cell module 12. The selected interconnection of the twelve cell modules provides a battery that can supply a maximum voltage of 100.8 V.

The invention claimed is:

1. A battery comprising first and second cell modules, each cell module comprising:
   a module housing consisting of metal and having a first and a second positive external electrical connection pole and a first and a second negative external electrical connection pole, and
   n identical cells each having at least one positive and at least one negative electrode arranged within the module housing,
   wherein n≥2, and the n cells have a common electrolyte system, and
   the first and second positive external electrical connection poles connect to positive electrodes of the n cells, the first and the second negative external electrical connection poles connect to negative electrodes of the n cells, the two first connection poles belong to a first electrical circuit, and the two second connection poles belong to a second electrical circuit,
   wherein the first and second cell modules are interconnected with one another in series or in parallel by the external electrical poles,
   a first cell having at least one first positive and at least one first negative electrode and a second cell having at least one second positive and at least one second negative electrode are arranged within the module housing,
   the at least one first positive electrode electrically connects to the first positive external electrical connection pole.

2. The battery as claimed in claim 1, wherein at least one of said first and second cell modules comprises n battery or capacitor cells as the n cells.
   the at least one first negative electrode electrically connects to the first negative external electrical connection pole,
   the at least one second positive electrode electrically connects to the second positive external electrical connection pole,
   the at least one second negative electrode electrically connects to the second negative external electrical connection pole, and
   the module housing is one of the electrical connection poles.

3. The battery comprising the first and second cell modules as claimed in claim 1, wherein the first positive external electrical connection pole of the first cell module electrically connects to the first negative external electrical connection pole of the second cell module, and the second positive external electrical connection pole of the first cell module electrically connects to the second negative external electrical connection pole of the second cell module.

4. The battery as claimed in claim 3, comprising m cell modules connected in series, wherein m is 12 and adjacent cell modules are each interconnected like the first and the second cell modules.

5. The battery as claimed in claim 1, comprising at least one cell based on C//NMC (Li nickel-manganese-cobalt) and/or based on C//LFP (Li iron phosphate).

* * * * *